United States Patent [19]
Carlson et al.

[11] Patent Number: 5,568,748
[45] Date of Patent: Oct. 29, 1996

[54] METHOD FOR MODIFYING THE SHIFTPOINTS OF AN AUTOMATIC TRANSMISSION

[75] Inventors: Douglas A. Carlson, Morton; Todd D. Creger, Metamora, both of Ill.

[73] Assignee: Caterpillar Inc., Peoria, Ill.

[21] Appl. No.: 371,236

[22] Filed: Jan. 11, 1995

[51] Int. Cl.⁶ .................................................. B60K 41/10
[52] U.S. Cl. ........................................ 74/336 R; 477/120
[58] Field of Search ................... 74/336 R, 337; 475/125; 477/120

[56] References Cited

U.S. PATENT DOCUMENTS

| | | | |
|---|---|---|---|
| 4,220,058 | 9/1980 | Petzold | 475/125 |
| 4,790,418 | 12/1988 | Brown et al. | 475/125 |
| 5,235,876 | 8/1993 | Minows et al. | 74/337 |
| 5,282,401 | 2/1994 | Hebbale et al. | 475/125 |
| 5,459,658 | 10/1995 | Morey et al. | 74/336 R |

*Primary Examiner*—Dirk Wright
*Attorney, Agent, or Firm*—David M. Masterson

[57] ABSTRACT

In one aspect of the present invention, a method of effecting shifts in a vehicle is disclosed. The method modifies the transmission shiftpoints in response the wheel power of the vehicle in order to optimize vehicle shifting, while reducing the potential for shift cycling.

14 Claims, 14 Drawing Sheets

Fig_6_

Fig_7_

Fig_9_

Fig_10_

METHOD FOR MODIFYING THE SHIFTPOINTS OF AN AUTOMATIC TRANSMISSION

TECHNICAL FIELD

This invention relates generally to a method for modifying preprogrammed shiftpoints of an automatic transmission and, more particularly, to modifying the preprogrammed shiftpoints in response to the wheel power of the vehicle.

BACKGROUND ART

Traditional automatic transmission controls effect power-shift gear ratio changes in accordance with a preselected shift map that is a function of transmission output speed. More particularly, each gear ratio has an associated upshift and downshift shiftpoint that is set at the factory. However, the factory upshift and downshift shiftpoints represent conservative values that are chosen to inhibit hunting or shift cycling, e.g., the transmission shifting back-and-forth between neighboring gear ratio pairs. Consequently, traditional automatic transmission controls use overly conservative shiftpoints which can limit the rimpull/speed performance of the vehicle when the driveline load limits vehicle speed at or near an upshift shiftpoint.

However, even though the traditional transmission shiftpoints are set conservatively, hunting may still result. This is shown in relation to Prior Art FIG. 14, where an example set of vehicle wheel power curves are illustrated. Note that the wheel power curves correspond to a pair of neighboring transmission gear ratios. This figure is used to illustrate how a fluctuating vehicle load may cause a hunting condition, even with conservative shiftpoints. For example, a fluctuating load is shown as an finite number of load lines that from a "wedge". The wedge represents a vehicle that is traversing a grade that has an irregular slope or a varying surface. The width of the wedge corresponds to the inclination of the slope and/or the surface variability. Consequently, a hunting condition may occur if the shiftpoints (points 2 and 3) are within the wedge. Thus, not only do traditional transmission shiftpoints limit the vehicle's wheel power, but traditional transmission shiftpoints may also result in hunting under some vehicle operating conditions.

The subject invention is directed towards a method that appropriately modifies the upshift and downshift shiftpoints over time that results in optimized transmission shifting to further improve vehicle performance, while minimizing any undesirable hunting characteristics.

DISCLOSURE OF THE INVENTION

In one aspect of the present invention, a method of effecting shifts in a vehicle is disclosed. The method modifies the transmission shiftpoints in response to the wheel power of the vehicle in order to optimize vehicle shifting, while reducing the potential for shift cycling.

BRIEF DESCRIPTION OF THE DRAWINGS

For a better understanding of the present invention, reference may be made to the accompanying drawings in which.

BEST MODE FOR CARRYING OUT THE INVENTION

Figure 1:
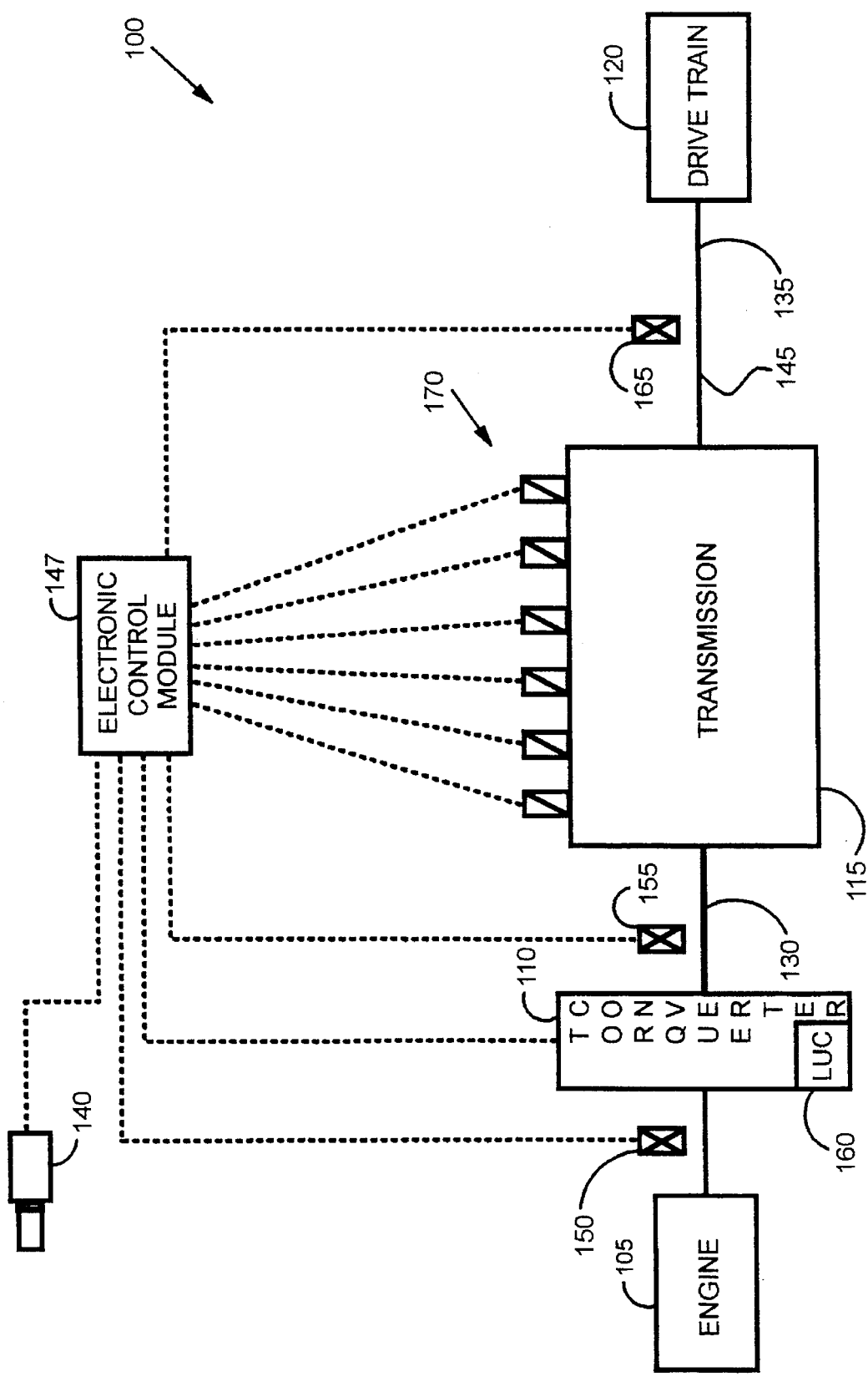
FIG. 1 is a block diagram of an electronic control system of a vehicle drive train including a transmission.

Referring now to the drawings, FIG. 1 illustrates an electronic control system of a power train 100 that includes an internal combustion engine 105, a multi-speed fluid operated power transmission 115, and a lower vehicle drive train 120. Additionally, a fluidic torque converter 110 may also be provided. The input 130 of the transmission 115 is connected to and driven by the engine 105 through a torque converter 110 that is equipped with a lockup clutch 160. The output 135 of the transmission 115 is connected to and adapted to rotatably drive a shaft 145. The shaft 145 is in turn connected to and adapted to drive the lower vehicle drive train to propel the vehicle.

An operator initiates a desired shift via an operator shift handle 140, which produces a desired gear selection signal. An electronic control module 147 receives the gear selection signal and responsively controls the operation of the transmission via upshift and downshift solenoids 170. The electronic control module 147 may also receive various other input signals representative of vehicle system parameters, including an engine speed signal from an engine speed sensor 150, a transmission input speed signal from a transmission input speed sensor 155, and a transmission output speed signal from a transmission output speed sensor 165. The sensors are conventional electrical transducers typically of the magnetic speed pickup type.

The electronic control module selectively delivers control signals to the solenoids to initiate gear change operations. Actuation of one of the shift solenoids displaces a rotary selector valve (not shown) to a position corresponding to the new gear ratio. When the selector valve is repositioned, the transmission automatically disengages the old gear and engages the new gear, as is common in the art. The electronic control module is also electrically connected to the lockup clutch for controlling its engagement and disengagement during shifting in a well known manner.

Internally, the electronic control module 147 comprises a number of conventional devices including a microprocessor with an internal clock, volatile and non-volatile memory, and input/output devices. Stored in the memory are upshift and downshift shiftpoints that are preprogrammed at the factory. The microprocessor utilizes arithmetic units to control the transmission shifting in accordance with software programs. More specifically, the microprocessor modifies or adjusts the transmission shift points according to vehicle performance. Typically, the programs utilized by the microprocessor are stored in volatile and non-volatile memory or the like. The programs are discussed in relation to various flowcharts, shown on FIGS. 3–12.

Further, the electronic control module preferably contains sufficient memory to store information relating to many of the variables and values to be described. This stored information may then be used to provide the program control with a historical representation of the drivetrain performance. Consequently, the stored information may be used by the control as a baseline for a specific vehicle in which to make many of the calculations described herein.

Figure 2:
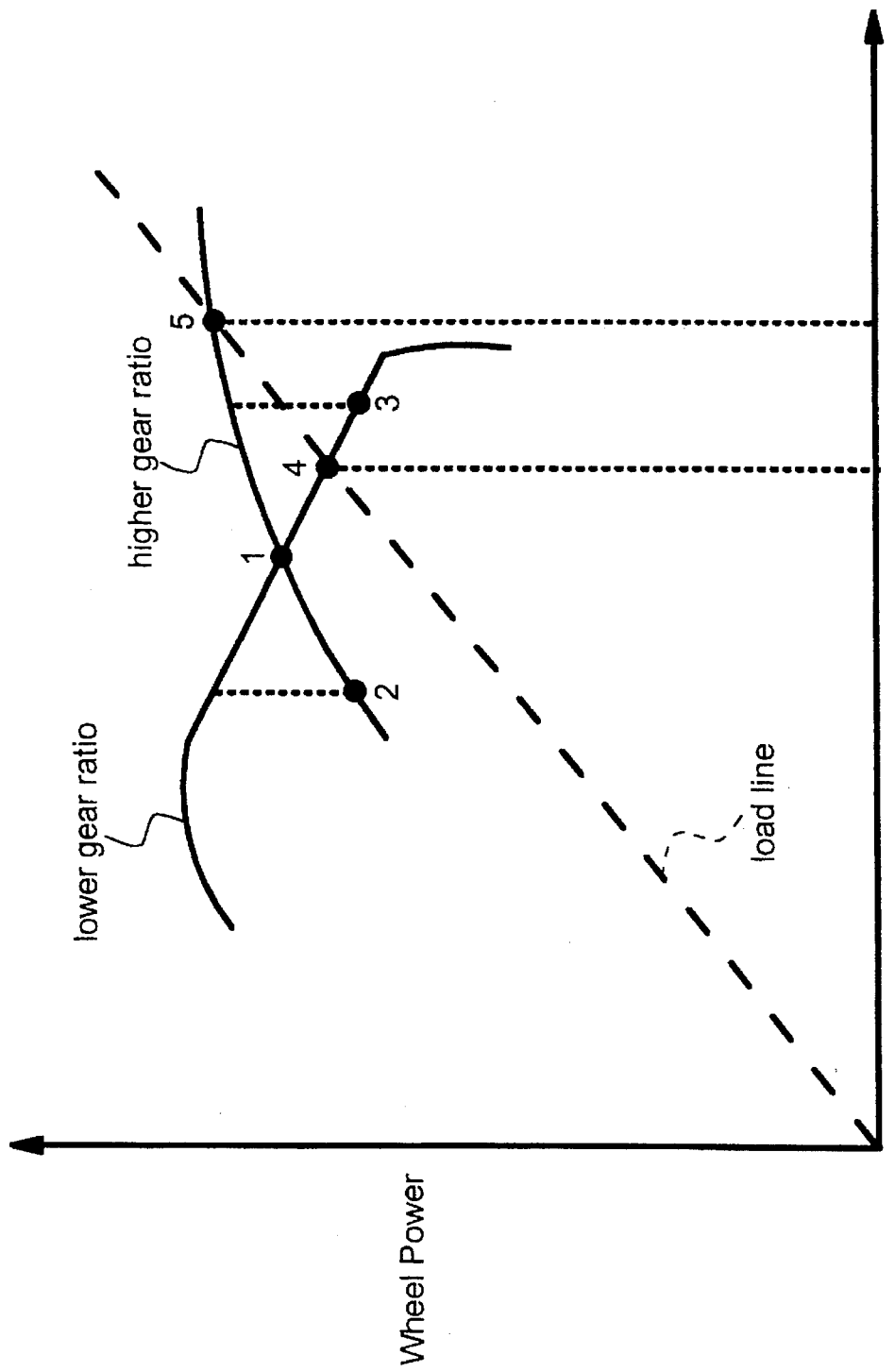
FIG. 2 is a graph showing an example set of vehicle wheel power curves associated with a neighboring gear ratio pair.

Referring now to FIG. 2, an example set of vehicle wheel power curves corresponding to a pair of neighboring transmission gear ratios are shown. Point 1 refers to a theoretically ideal, nominal crossover shiftpoint (the value of which is typically unknown during vehicle operation); point 2 refers to a factory preprogrammed downshift shiftpoint; and point 3 refers to a factory preprogrammed upshift shiftpoint. Note that, point 3 is typically conservatively selected to minimize hunting.

Current state-of-the-art transmissions, shift from a lower gear ratio to a next higher gear ratio when the output speed of the transmission reaches the speed value represented by point 3. However, when the vehicle is traveling up a grade, the associated driveline load may be similar to that shown by the dashed load line. In this example, the transmission will not achieve a shift to the next higher gear ratio because the required shift speed at point 3 cannot be reached due to the load line intersecting the wheel power curve at point 4. Consequently, the vehicle's travel speed will be that indicated by transmission output speed A; as opposed to the desirable transmission output speed B.

One feature of the present invention is determining approximately where the crossover shiftpoint occurs then responsively modifying or adjusting the factory upshift shiftpoint to a value near the crossover shiftpoint. As a result, the transmission is able to shift to the next higher gear ratio when the driveline load is near the upshift shiftpoint. Advantageously, the present invention utilizes vehicle speed data to determine when and how much the transmission shiftpoints should be modified, while additionally minimizing repetitive hunting cycles.

The flowcharts illustrated in FIGS. 3 to 12 represent computer software logic for implementing the preferred embodiment of the present invention. The program depicted on the flowcharts is adapted to be utilized by any suitable microprocessor system.

FIGS. 3 to 12 are flowcharts representative of computer program instructions executed by the computer-based control unit of FIG. 1 in carrying out the shift control technique of the present invention. In the description of the flowcharts, other than FIG. 3, the functional explanation marked with numerals in angle brackets, <nnn>, refers to blocks bearing that number.

Figure 3:
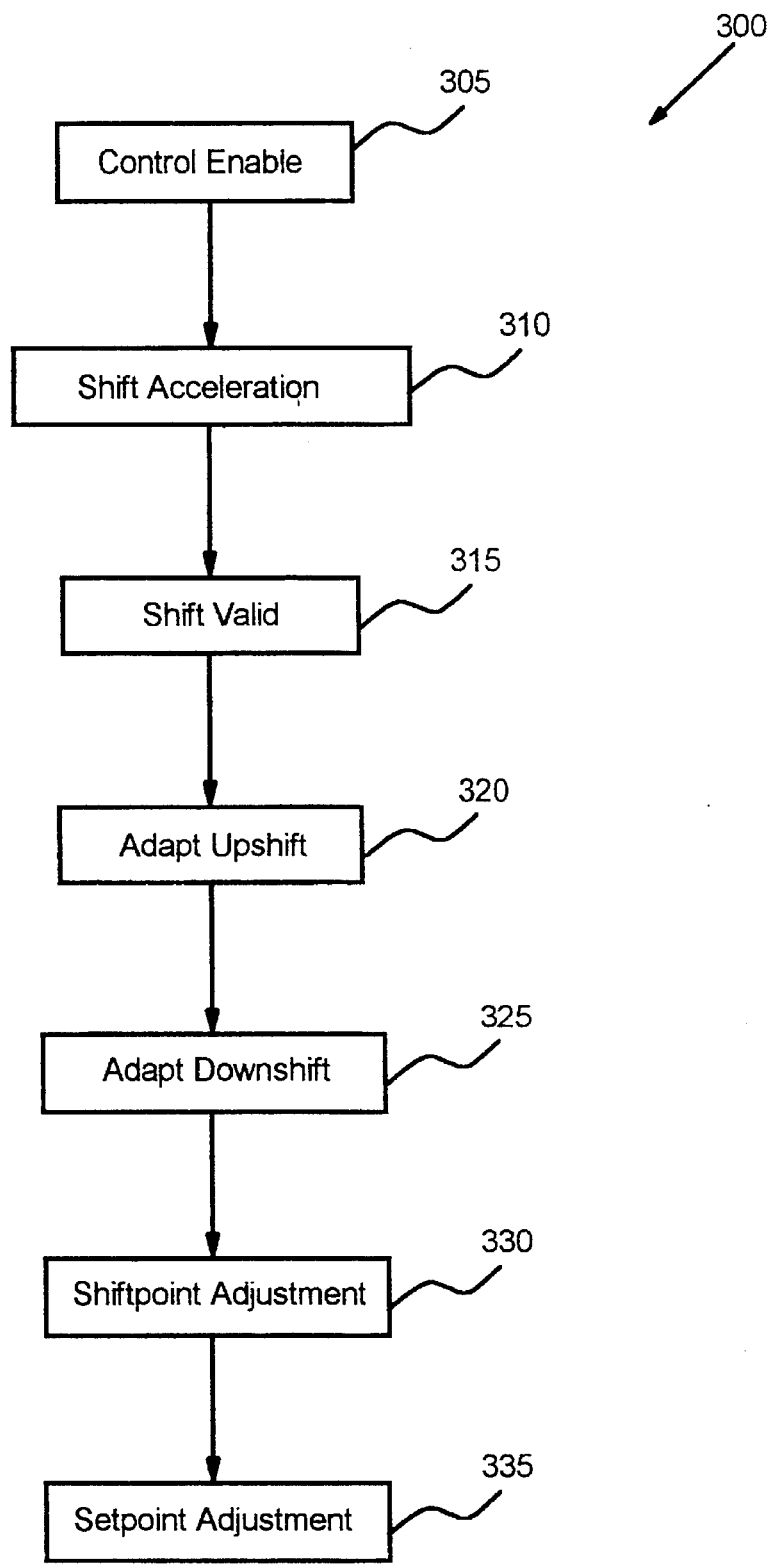
FIG. 3 is a flow chart showing the program control of an executive subroutine.

FIG. 3 represents an executive or main loop program which directs the sequential execution of various subroutines. At block 305, a Control Enable subroutine determines whether the current operating conditions are sufficient to start or enable the subsequent subroutines of the adaptive shiftpoint control. At block 310, a Shift Acceleration subroutine determines the acceleration of the transmission output speed before and after a shift. At block 315, a Valid Shift subroutine determines whether the current shift represents desirable data in which to adapt or modify the transmission shiftpoints.

At block 320, an Adapt Upshift subroutine modifies or adapts the upshift transmission shiftpoint of the current gear ratio in response to the preshift and postshift accelerations determined at block 310. At block 325, an Adapt Downshift subroutine modifies or adapts the downshift transmission shiftpoint of the next higher gear ratio in response to the adapted upshift shiftpoint of the current gear ratio. At block 330, a Shiftpoint Adjustment subroutine determines whether any temporary adjustments need be made to the adapted upshift shiftpoint in order to counter any hunting or shift cycling effects. Note that, blocks 310 through 330 represent separate shift strategies for each transmission shiftpoint for each gear ratio. Thus, modification or adjustment of a shiftpoint associated with one transmission gear ratio is independent to shiftpoint adjustments for other transmission gear ratios.

Finally at block 335, a Setpoint Adjustment subroutine determines whether any adjustments need be made to a desired delta acceleration setpoint in order to account for any changes to the vehicle powertrain performance that occur over time. The desired delta acceleration setpoint represents a desired vehicle acceleration difference before and after a shift, and is used in modifying the upshift shiftpoint.

Figure 4:
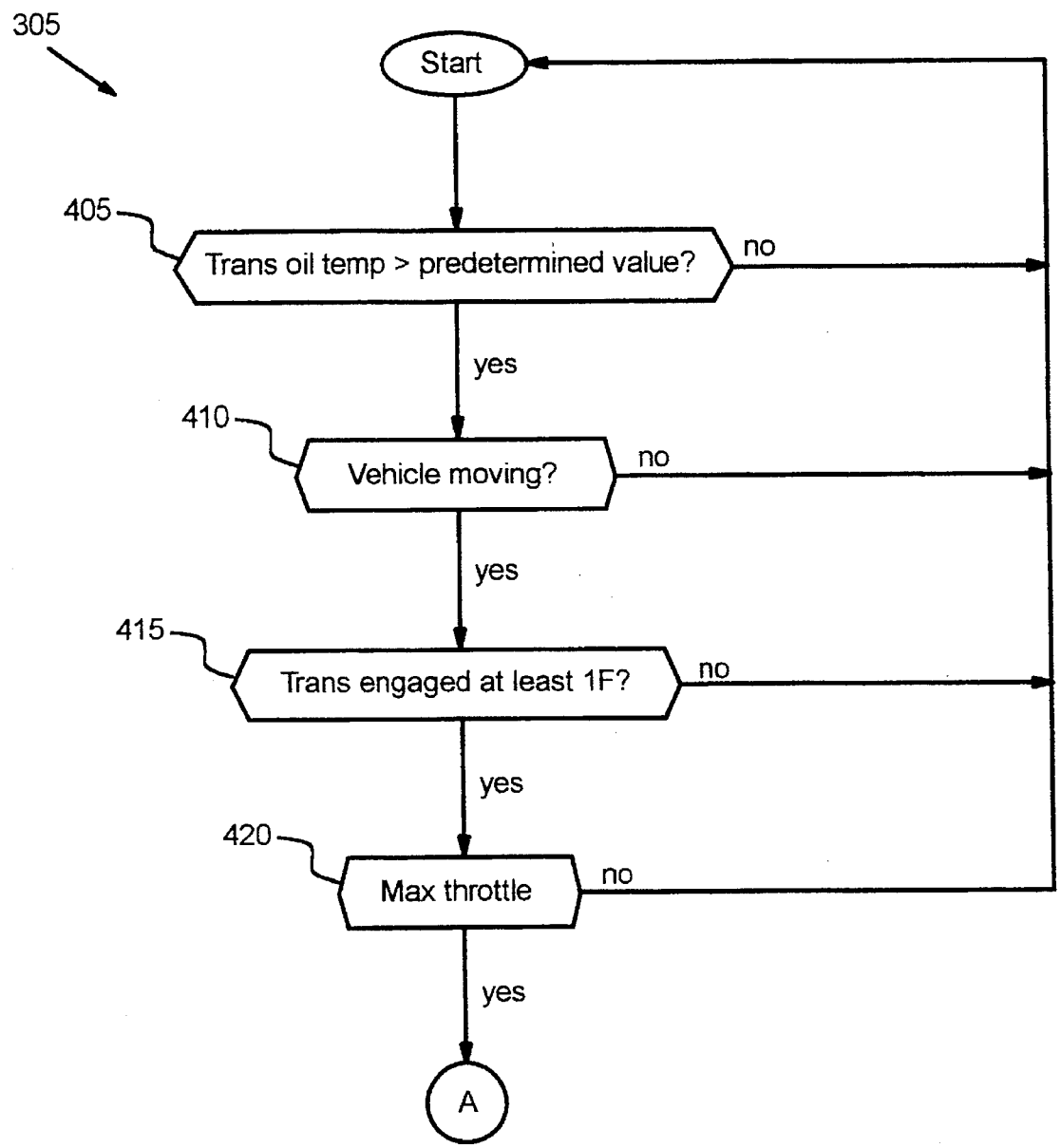
FIG. 4 is a flow chart showing the program control of a control enabling subroutine.

The program control of the Control Enable subroutine will now be discussed in relation to FIG. 4. The program control determines whether several initial conditions are satisfied prior to enabling the adaptive shiftpoint control. The initial conditions are not limited to, but may include: whether the transmission oil temperature is greater than a predetermined value <405>, whether the vehicle is moving <410>, whether the transmission is engaged in at least first gear forward <415>, and whether the throttle is at maximum throttle <420>. If all these conditions occur, then the program control proceeds to the Shift Acceleration subroutine 310.

Figure 5:
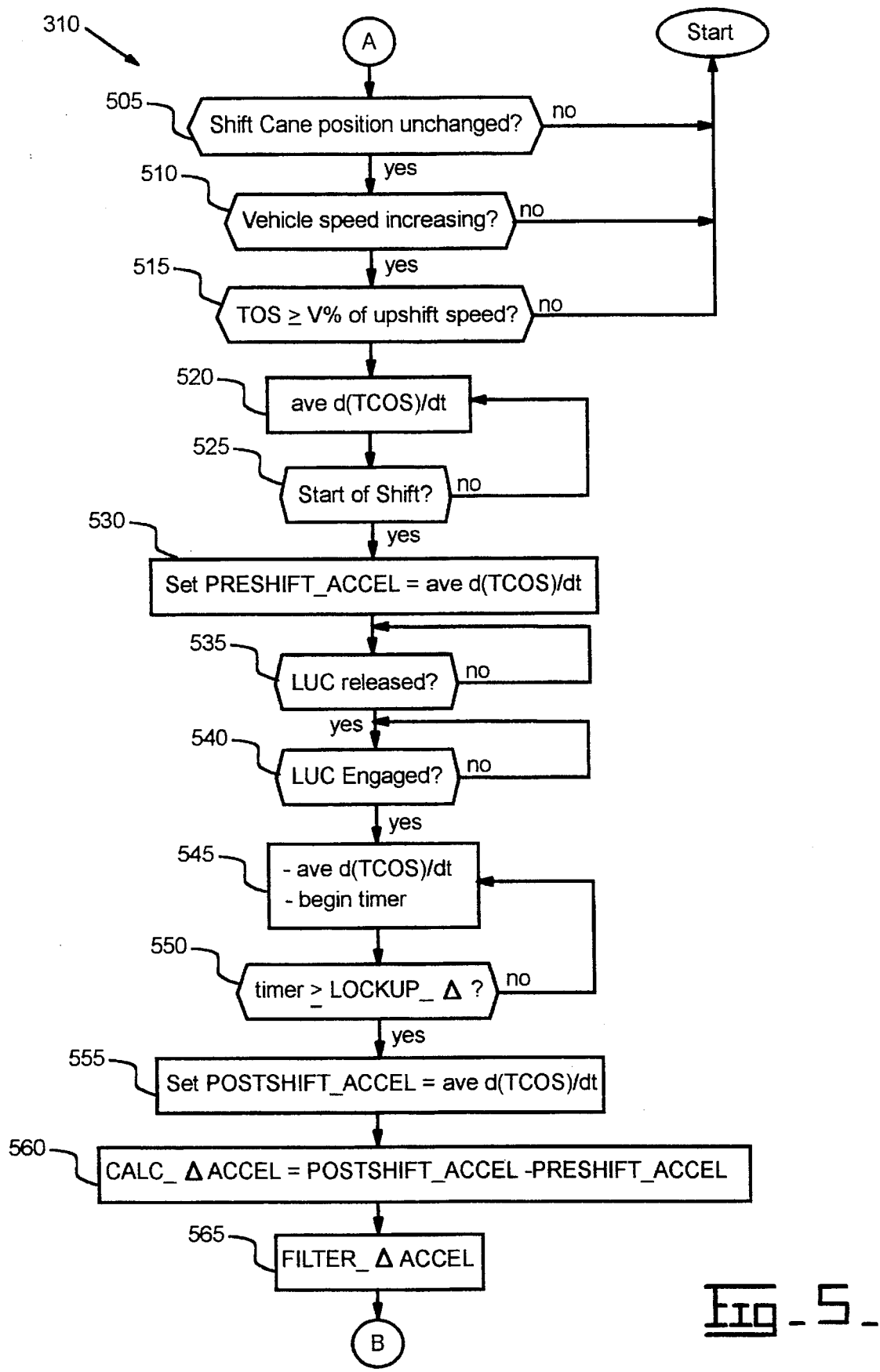
FIG. 5 is a flow chart showing the program control of a shift acceleration subroutine.

The program control for the Shift Acceleration subroutine is shown at FIG. 5. The program control determines the preshift and postshift transmission output speed accelerations in order to assess shift performance and quality. First, the program control determines whether the shift cane or shift control handle has moved since the start of the Control Enable subroutine <505>. The control additionally determines whether the vehicle speed is increasing <510>, and whether the transmission output speed (TOS) is within a predetermined range of the upshift speed (for the current gear ratio) <515>. If the above three conditions occur, then the program control initiates a "running average" calculation of the derivative of the torque converter output speed (TCOS) <520>, i.e., a running average of the TCOS acceleration.

Once the program control determines that the transmission is beginning to shift <525>, then PRESHIFT_ACCEL is set to the average value of the TCOS acceleration determined at the time that the upshift has begun <530>. The program control then delays, until the lock-up clutch (LUC) is released <535>. Once the LUC is re-engaged, which is indicative of a completed shift <540>, the program control again initiates a running average calculation of the postshift TCOS acceleration, and begins a timer <545>. Once the control determines that the timer is greater or equal to a predetermined value (LOCKUP_Δ) <550>, then POSTSHIFT_ACCEL is set to the mean of the running average TCOS acceleration value <555>. Block 550 results in a delay to allow for more accurate data due to the torsional effects of the powertrain after a shift is complete.

Note that, not only are the preshift and postshift acceleration values indicative of vehicle acceleration, but the values additionally indicate the wheel power of the vehicle. Further, although the vehicle's wheel power is determined in response to TOS, it will be apparent to those skilled in the art that other means may be utilized including: accelermotors, torque sensors, or the like.

The control then calculates the actual acceleration difference, CALC_ΔACCEL, between the postshift and preshift vehicle accelerations <560>. It is important to note that the actual acceleration difference is indicative of the location of the upshift shiftpoint in relation to the crossover shiftpoint. For example, an actual acceleration difference of zero indicates that the upshift shiftpoint is located at or very near the crossover shiftpoint. While an actual acceleration difference having positive value indicates that the upshift shiftpoint is located to the right of the crossover point, and an actual acceleration difference having a negative value indicates that the upshift shiftpoint is located to the left of the crossover shiftpoint. Consequently, the value of the actual acceleration difference is useful in determining how much the upshift shiftpoint should be adjusted to result in an optimized shift. Finally, the actual acceleration difference is filtered in a manner using well known digital software filtering techniques, resulting in a value referred to as FILTER_ΔACCEL <565>.

Figure 6:
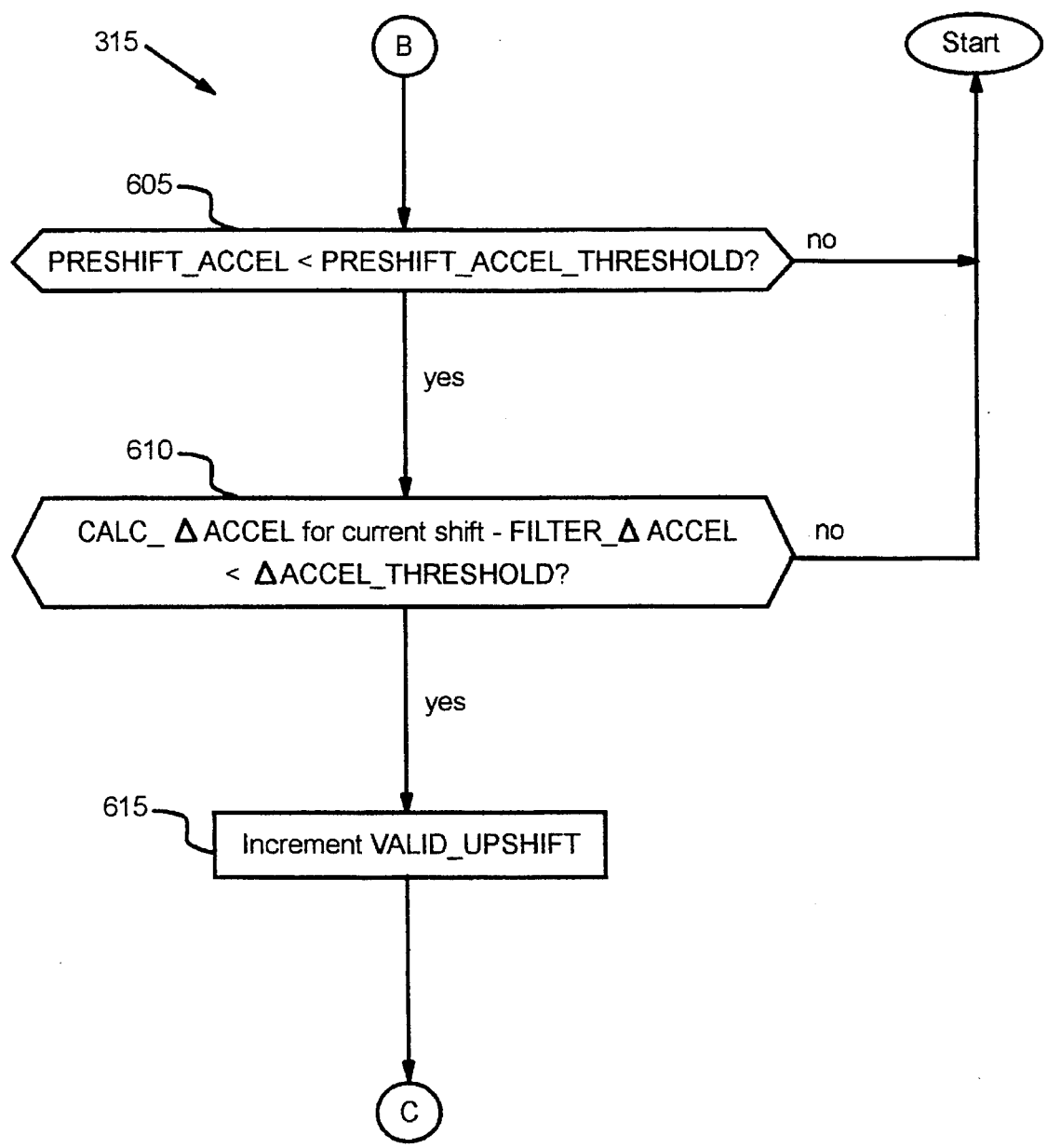
FIG. 6 is a flow chart showing the program control of a valid shift subroutine.

The program control then proceeds to the Valid Shift subroutine, shown in FIG. 6. Here, the program control determines whether the preshift and postshift acceleration values for the recently completed shift exhibit acceptable characteristics in order to be used for subsequent shiftpoint adaptation calculations. First, the control determines whether the preshift acceleration value, PRESHIFT_ACCEL, is less than a predetermined value, PRESHIFT_ACCEL_THRESHOLD <605>. The control then determines if CALC_ΔACCEL for the current shift minus FILTER_ACCEL is less than a predetermined value, ΔACCEL_THRESHOLD <610>.

Block 605 is used to determine whether the driveline load is reasonably close to the shiftpoint; while, block 610 is used to determine whether the current shift has produced an anomalous or "flyer" value. If either of blocks 605 or 610 are false, then the recently completed upshift is considered unsatisfactory for purposes of shiftpoint adaptation. Consequently, the control will then wait for the next valid shift to occur. However, if both blocks 605 and 610 are true, then VALID_UPSHIFT is incremented <615>. Consequently, the program control proceeds to the Adapt Upshift subroutine 320.

Figure 7:
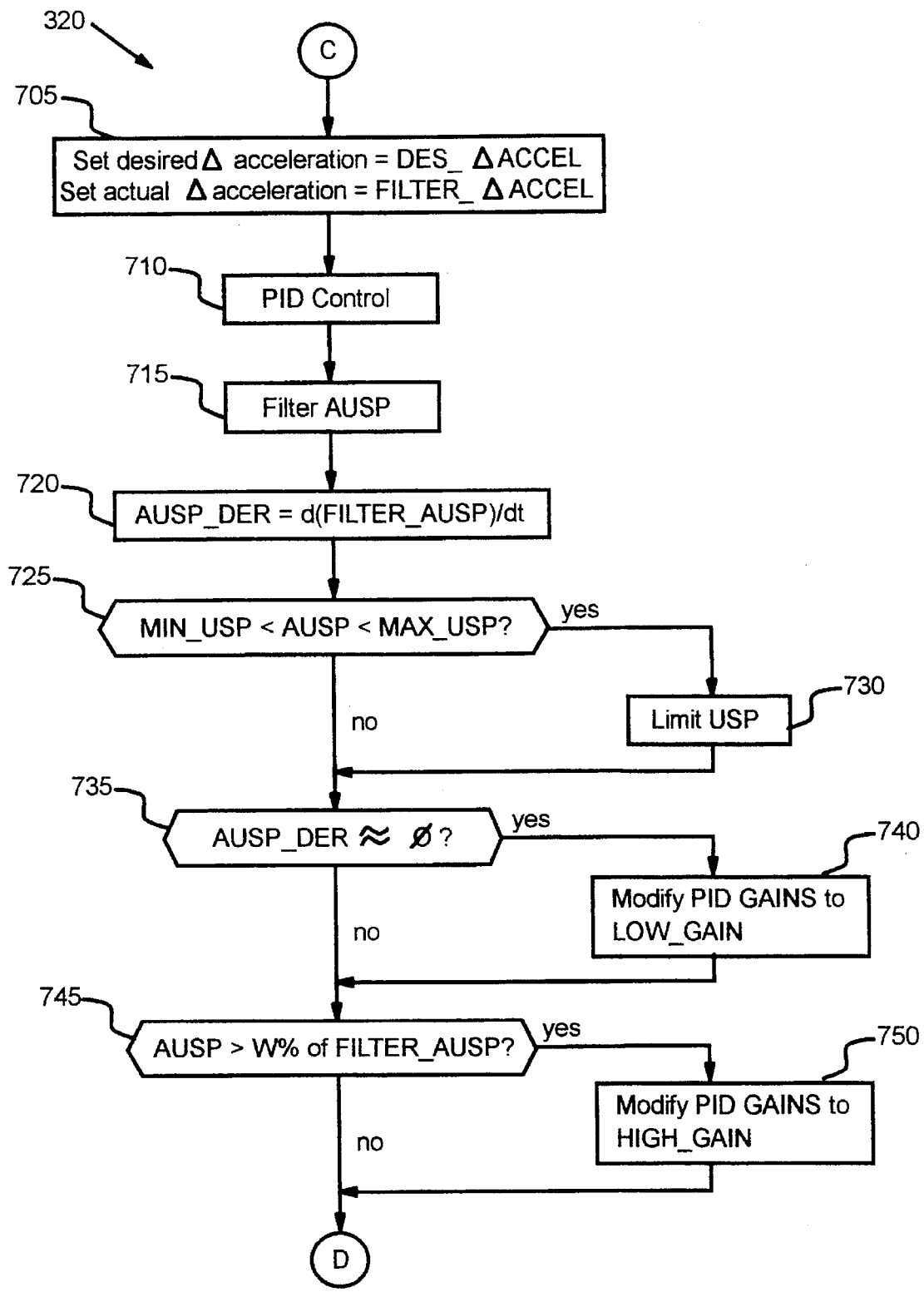
FIG. 7 is a flow chart showing the program control of an adapt upshift subroutine.
Figure 8:
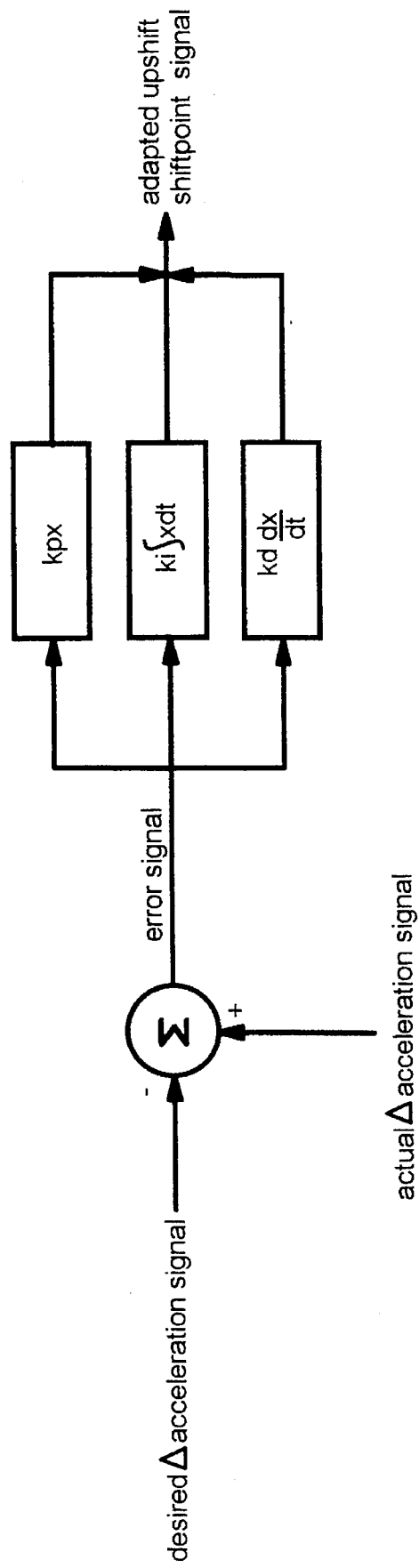
FIG. 8 is a block diagram showing the closed loop control of the adapt upshift subroutine.

The program control for the Adapt Upshift subroutine 320 is shown in relation to FIG. 7. Here, the program control adapts or modifies the upshift shiftpoint for the current gear ratio in order to optimize transmission shifting performance. First, a desired delta acceleration setpoint, DES_ΔACCEL, is initially set to a factory default value; while an actual delta acceleration setpoint is set to the value of FILTER_ΔACCEL <705>. Thereafter, the program control initiates a closed loop controller <710>. For example, several types of controllers may be initiated, including: a Proportional (P), a Proportional+ Integral (PI), or a Proportional+Integral+ Derivative (PID) controller. Although the present invention is not limited to any one type of controller, a PID controller is discussed and shown in FIG. 8 for illustrative purposes.

Accordingly, the desired and actual delta acceleration signals are received by the PID controller. The controller produces an error signal in response to the difference between the delta acceleration signals. The error signal is multiplied by proportional, integral, and derivative gains. Resultingly, an adapted upshift shiftpoint signal is produced that is indicative of a new or adapted upshift shiftpoint, AUSP. Note that, the initial condition for the integrator block is set equal to the factory upshift shiftpoint speed for any given gear ratio.

Adverting back to FIG. 7, the control tracks and filters AUSP <715> and determines the derivative of the filtered AUSP value <720>. The control then determines if the adapted upshift shiftpoint is outside a predetermined range <725>. If so, then the adapted upshift shiftpoint is limited by an outer range of values <730>.

Next, the control determines whether the PID gain values should be modified. First, the control compares the derivative of the adapted upshift shiftpoint, AUSP_DER to zero <735>. If AUSP_DER is within a predetermined range of zero, then the PID gain values are set to LOW GAIN values to result in a somewhat slower, more stable, response <740>. Additionally, the control determines if the AUSP values for the past predetermined number of shifts have changed greater than a predetermined percentage of the filtered AUSP value <745>. If so, then the PID gain values are reset back to the HIGH GAIN values for a quicker response <750>. The program control then proceeds to the Adapt Downshift subroutine 325.

Figure 9:
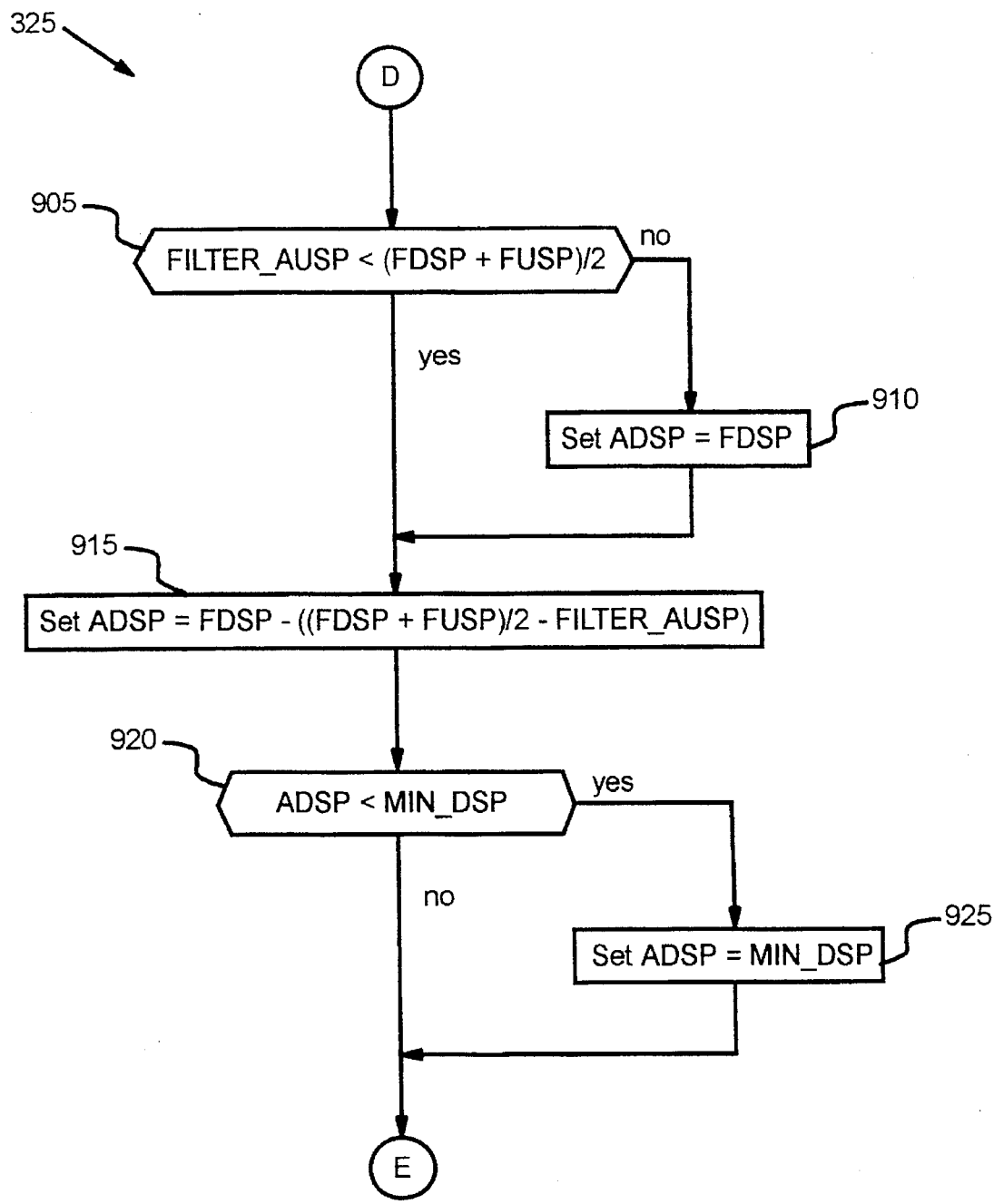
FIG. 9 is a flow chart showing the program control of an adapt downshift subroutine.

The program control for the Adapt Downshift subroutine 325 is shown in relation to FIG. 9. The program control modifies the downshift shiftpoint of the next higher gear ratio in response to the adapted upshift shiftpoint of the current gear ratio in order to maintain a predetermined relationship between the downshift and upshift shiftpoints of the neighboring gear ratio pair.

The program control first determines whether the filtered adapted upshift shiftpoint is less than halfway between the factory downshift and upshift shiftpoints, FDSP and FUSP <905>. If not, then an adapted downshift shiftpoint, ADSP, is set to the factory downshift shiftpoint, FDSP <910>. Otherwise, the control sets the adapted downshift shiftpoint to the value represented by block 915. Next, the adapted downshift shiftpoint, ADSP, is compared to a predetermined minimum downshift shiftpoint, MIN_DSP <920>. If ADSP is less than MIN_DSP, then ADSP is set to the value of MIN_DSP <925>. Program control then proceeds to the Shiftpoint Adjustment subroutine 330.

Figure 10:
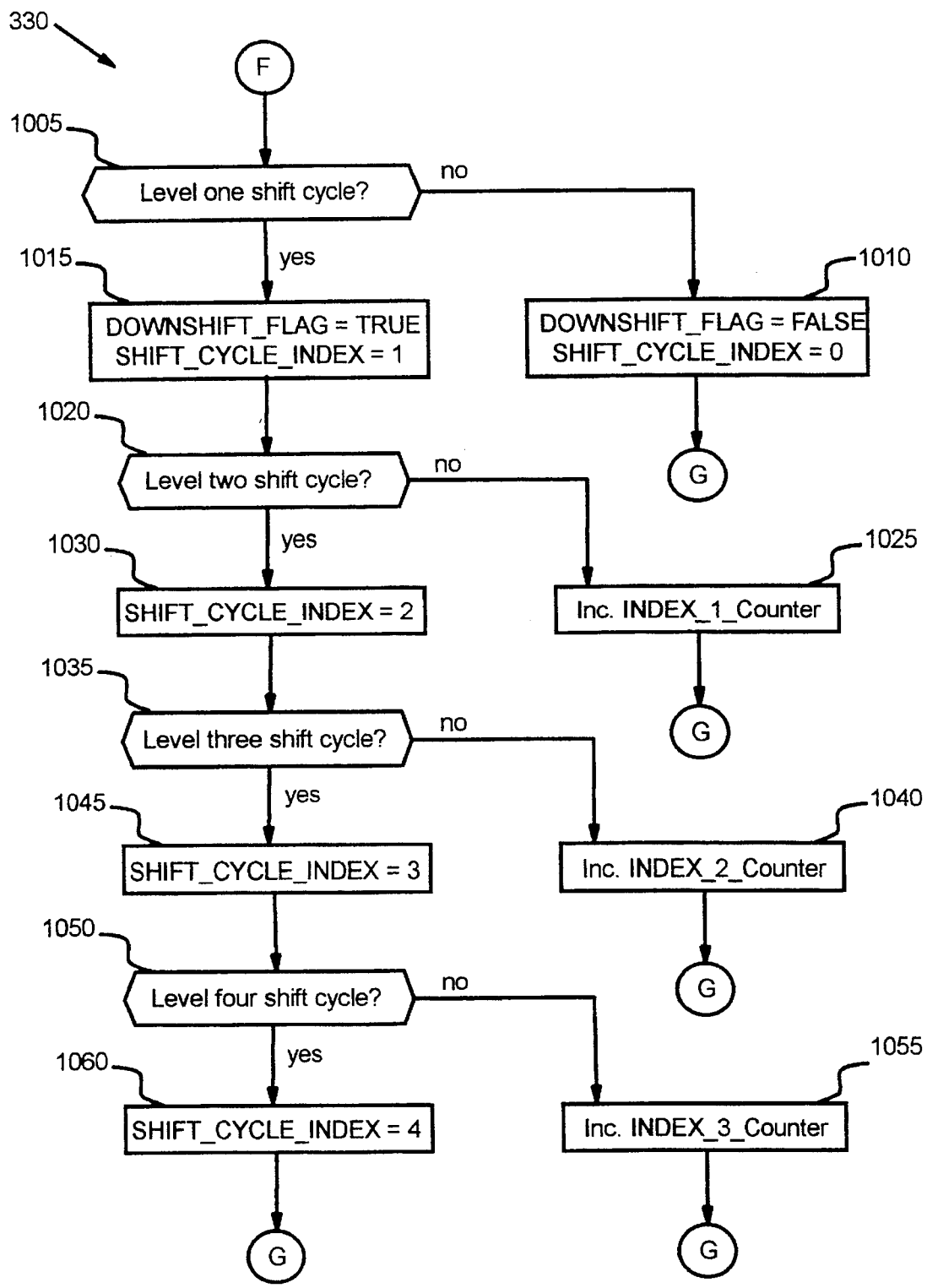
FIGS. 10–11 are flow charts showing the program control of a shiftpoint adjustment subroutine.
Figure 11:
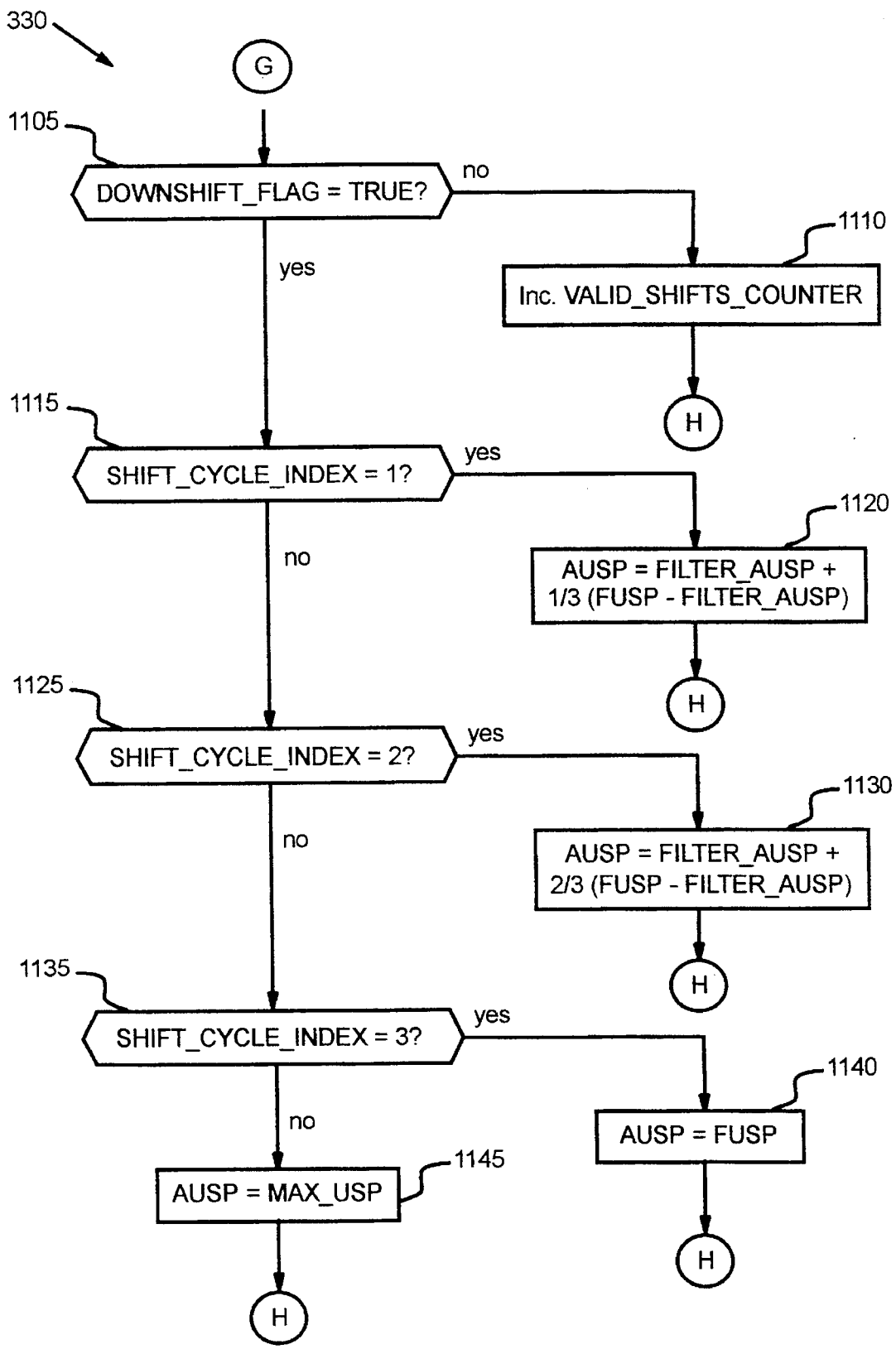

The program control for the Shiftpoint Adjustment subroutine 330 is shown in relation to FIGS. 10 and 11. The control logic associated with FIGS. 10 and 11 is provided to temporarily interrupt a short term cycling or hunting problem.

Referring now to FIG. 10, the program control determines if the transmission is hunting or cycling back-and-forth between a neighboring gear ratio pair; and if so, the control determines to what extent shift cycling may be occurring. If shift cycling is found to be occurring, then the control (at FIG. 11) temporarily adjusts the adapted upshift shiftpoint to stop the shift cycling condition.

First, the control determines if a level one shift cycle has occurred <1005>. A level one shift cycle occurs when the transmission shifts from a current gear ratio to the next higher gear ratio and then back down to the current gear ratio within a predetermined time period. If a level one shift cycle does not occur (which indicates that no shift cycling is present), then a DOWNSHIFT_FLAG is set to FALSE and SHIFT_CYCLE_INDEX is set to zero <1010>. However, if a level one shift cycle does occur, then DOWNSHIFT_FLAG is set to TRUE and SHIFT_CYCLE_INDEX is set to one <1015>. The program control then determines whether a level two shift cycle has occurred <1020>. A level two shift cycle is defined as a second occurrence of a level one shift cycle, e.g., the transmission shifting from a current gear ratio to the next higher gear ratio and back down to the current gear ratio (level one shift cycle); and after a predetermined time period, the transmission shifting again from the current gear ratio to the next higher gear ratio and back down to the current gear ratio within a predetermined time period.

If a level two shift cycle does not occur, then INDEX_1_COUNTER is incremented <1025>. However, if a level two shift cycle does occur, then SHIFT_CYCLE_INDEX is set to two <1030>. The program control then determines whether a level three shift cycle has occurred <1035>. A level three shift cycle is defined as a third occurrence of a level one shift cycle. If a level three shift cycle does not occur, then an INDEX_2_COUNTER is incremented <1040>. However, if a level three shift cycle does occur, then SHIFT_CYCLE INDEX is set to three <1045>.

Finally, the program control determines whether a level four shift cycle has occurred <1050>. A level four shift cycle is defined as a fourth occurrence of a level one shift cycle. If a level four shift cycle does not occur, then INDEX_3_COUNTER is incremented <1055>. However, if a level four shift cycle does occur, then SHIFT_CYCLE_INDEX is set to four <1060>.

Program control then proceeds to FIG. 11 to determine whether the adapted upshift shiftpoint needs to be immediately adjusted in response to a shift cycling occurrence. First, the program control determines whether DOWNSHIFT_FLAG is FALSE <1105>; if so, VALID_SHIFTS_COUNTER is incremented <1110>. Otherwise, the control determines whether SHIFT_CYCLE_INDEX is set to one <1115>; if so, the adapted upshift shiftpoint, AUSP, is temporally set equal to the value shown in block 1120. If SHIFT_CYCLE_INDEX is set to two <1125>, then the adapted upshift shiftpoint, AUSP, is temporarily set equal to the value represented by block 1130.

Alternatively, if SHIFT_CYCLE_INDEX is set to three <1135>, then the adapted upshift shiftpoint, AUSP, is temporarily set to the factory upshift shiftpoint, FUSP <1140>. However, if SHIFT_CYCLE_INDEX is not set to zero, one, two, or three, then the adaptive upshift shiftpoint, AUSP, is temporarily set to a maximum upshift shiftpoint, MAX_USP <1145>.

Note that, the temporary adjustments to the adapted upshift shiftpoint will be terminated at such time when the transmission has reached a gear ratio above or below the current gear ratio pair where shift cycling was occurring. Further, it will be apparent to those skilled in the art that neither adding more stages nor reducing the number of stages shown in FIG. 11 limits the scope of the present invention.

Figure 12:
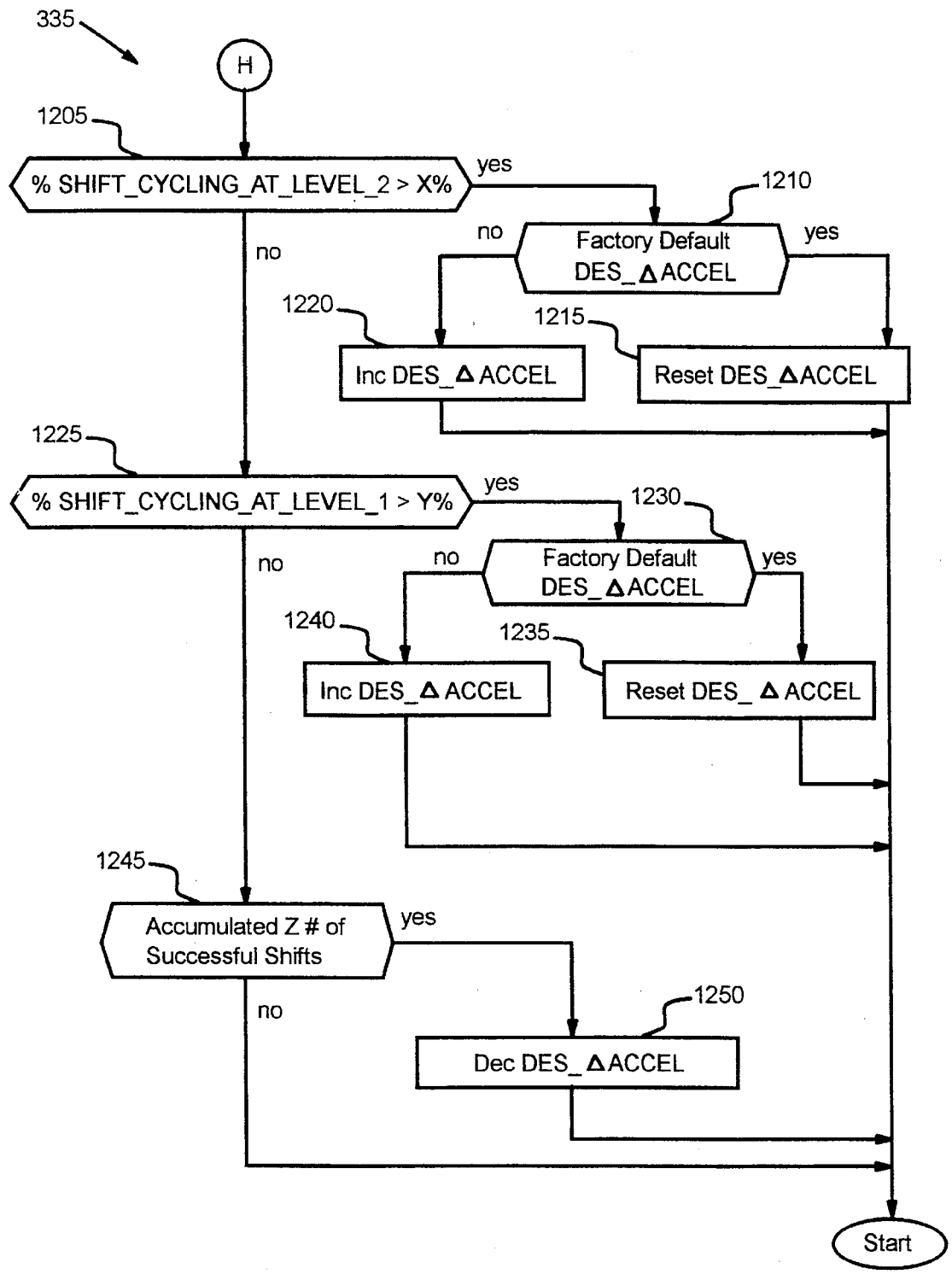
FIG. 12 is a flow chart showing the program control of a setpoint adjustment subroutine.

The program control finally proceeds to FIG. 12 to determine whether the desired delta acceleration setpoint needs to be modified in response to shift cycling occurrences that have been caused by long term vehicle operating conditions. For example, shift cycling conditions may occur in response to the changing driveline dynamics that are attributed to the age and/or condition of the vehicle. Consequently, the present invention monitors the frequency of shift cycling occurrences during the life of the vehicle. Advantageously, the present invention increases the desired delta acceleration setpoint value to reduce future shift cycling occurrences.

The control first determines whether the percent of shift cycling at level 2 is greater than a predetermined value <1205>. The percent of shift cycling at level 2 is determined by dividing INDEX_2_COUNTER by VALID_SHIFTS_COUNTER. If the percent of shift cycling at level 2 exceeds the allowable amount, then the control determines whether the desired delta acceleration setpoint, DES_$\Delta$ACCEL, is set to the factory default value <1210>. If so, then the control resets the desired delta acceleration setpoint, DES_$\Delta$ACCEL, to a value at or greater than the value of FILTER_$\Delta$ACCEL, <1215>.

However, if the desired delta acceleration setpoint, DES_$\Delta$ACCEL, is not set to the factory default value, then the current desired delta acceleration setpoint value is progressively incremented by predetermined amounts corresponding to increasing values of the INDEX_2_COUNTER <1220>. For example, in response to a first occurrence of a shift cycling condition at level 2, the current desired delta acceleration setpoint value will be incremented by a predetermined amount. However, with the next occurrence of a shift cycling condition at level 2, the current desired delta acceleration setpoint value will be incremented by a greater amount than that made during the first increase.

The control additionally determines whether the percent of shift cycling at level 1 is greater than a predetermined value <1225>. The percent of shift cycling at level 1 is determined by dividing INDEX_1_COUNTER by VALID_SHIFTS_COUNTER. If the percent of shift cycling at level 1 exceeds the allowable amount, then the control determines whether the desired delta acceleration setpoint, DES_$\Delta$ACCEL, is set to the factory default value <1230>. If so, then the control resets the desired delta acceleration setpoint, DES_$\Delta$ACCEL, to a value at or greater than the value of FILTER_$\Delta$ACCEL, <1235>. However, if the desired delta acceleration setpoint, DES_$\Delta$ACCEL, is not set to the factory default value, then the current desired delta acceleration setpoint value is progressively incremented by predetermined amounts corresponding to increasing values of the INDEX_1_COUNTER <1240>.

If, however, the percentage of shift cycling is within acceptable levels, then the program control determines whether to decrease the desired delta acceleration setpoint value in order to "move" the upshift shiftpoint yet closer to the ideal nominal crossover shiftpoint.

Accordingly, the control first determines whether a predetermined number of successful shifts have occurred <1245>. If a predetermined number of successful shifts have occurred, and if, FILTER_$\Delta$ACCEL reaches a predetermined percentage of DES_$\Delta$ACCEL, then the desired delta acceleration setpoint, DES_$\Delta$ACCEL, is progressively decremented by a predetermined value until: a minimum value is reached; or a shift cycling event occurs <1250>.

INDUSTRIAL APPLICABILITY

As described above, the present invention advantageously modifies the transmission shiftpoints to improve the wheel power of the vehicle. More specifically, the present invention "positions" the upshift shiftpoint closer to the ideal "crossover" point to improve vehicle performance. Additionally, the shiftpoints are modified in a manner to minimize hunting or shift cycling problems. Thus, the present invention modifies the shiftpoints enough to improve wheel power, yet not too much to cause undesirable shift cycling conditions. Accordingly, the present invention is applicable to such vehicle transmissions that are associated with various types of working vehicles, including: on-highway or off-highway trucks, wheel loaders, or the like.

Figure 13:
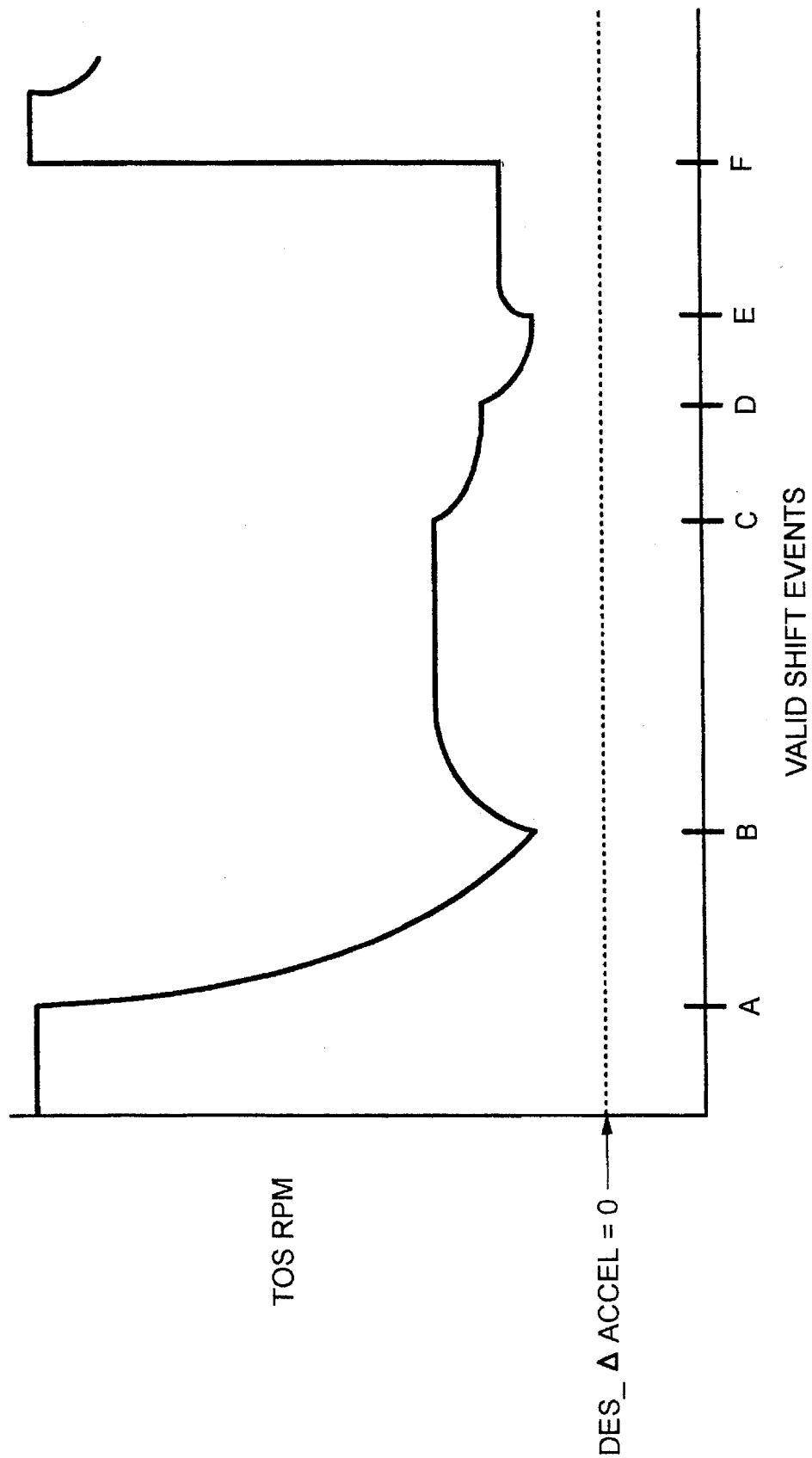
FIG. 13 is a graph showing an adapted upshift shiftpoint profile.
Figure 14:
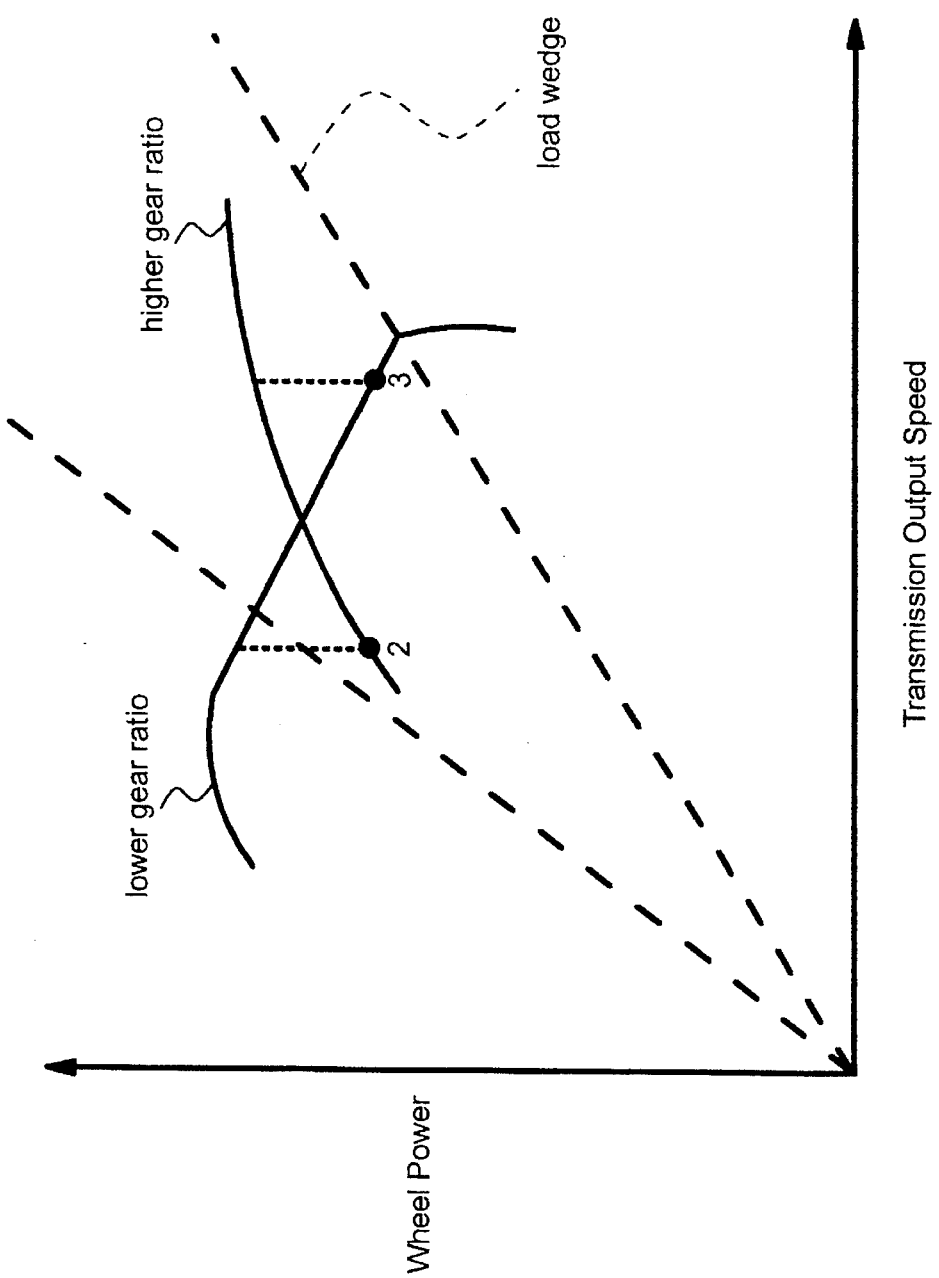
FIG. 14 is a prior art graph showing an example set of vehicle wheel power curves and a fluctuating load wedge.

Reference is now made to FIG. 13, which illustrates the operation of the present invention. For example, FIG. 13 shows an example of an upshift shiftpoint profile of a neighboring gear ratio pair that has been modified or adapted by the present invention. Note that the time period may correspond to several or several hundred operating hours of the vehicle.

The initial factory upshift shiftpoint is utilized until the vehicle accumulates the minimum number of valid shift events for the neighboring gear pair. Upon accumulating a predetermined number of valid shifts, at event A, the control begins to modify the upshift shiftpoint with each successive valid shift to approach a speed that corresponds to an initial DES_ΔACCEL value, i.e., the target value.

As the adapted upshift shiftpoint approaches the DES_ΔACCEL value, a hunting or shift cycling condition occurs, at event B. Responsively, the control modifies the DES_ΔACCEL value from the initial value to the current FILTER_ΔACCEL value, plus a predetermined amount to inhibit the hunting. As the successive number of valid shift accumulate, the adapted upshift shiftpoint value approaches a steady state value. However, at event C, the control recognizes that the adapted upshift shiftpoint value is now too conservative because no hunting conditions have occurred during a predetermined number of valid shift events. Advantageously, the control then decrements the DES_ΔACCEL value in order to achieve a greater wheel power immediately following the shift.

As the successive number of valid shift accumulate, the control once again recognizes that the adapted upshift shiftpoint value is still too conservative. Accordingly, at event D, the control again decrements the DES_ΔACCEL value. However, at event E, a shift cycling condition occurs. The control then modifies the DES_ΔACCEL value from its current value to a value greater than the current FILTER_ΔACCEL value in order to prevent the shift cycling condition.

The adapted upshift shiftpoint approaches a steady state value until the engine or transmission is repaired, or a severely repetitive shift cycling condition occurs, at event F. Consequently, the control "resets" the adapted upshift shiftpoint back to the initial factory upshift shiftpoint value. The control then continues to modify the adapted upshift shiftpoint value as needed.

Note that the above illustration pertains to one of many examples of adapting the upshift shiftpoint. Those well skilled in the art will recognize that the control will produce a different adapted upshift shiftpoint profile in response to different vehicle load conditions.

Thus, while the present invention has been particularly shown and described with reference to the preferred embodiment above, it will be understood by those skilled in the art that various additional embodiments may be contemplated without departing from the spirit and scope of the present invention.

We claim:

1. A method of effecting transmission shifts in a vehicle having an automatic transmission including a plurality of transmission gear ratios and a transmission actuator for automatically establishing a particular gear ratio in response to a transmission control signal, the method comprising the steps of:

storing an upshift and downshift shiftpoint for each transmission gear ratio;

determining the wheel power of the vehicle before and after a transmission upshift operation;

determining the difference in wheel power before and after the transmission upshift operation;

modifying the upshift shiftpoint associated with the upshift operation to achieve a desired change in wheel power; and modifying the desired change in wheel power magnitude in response to a shift cycling condition.

2. A method, as set forth in claim 1, wherein the step of determining the wheel power includes the steps of:

sensing the output speed of the transmission prior to a transmission upshift operation, determining the vehicle acceleration based on the transmission output speed, and producing a preshift acceleration signal indicative of the wheel power prior to the upshift operation;

sensing the output speed of the transmission subsequent to the upshift operation, determining the vehicle acceleration based on the transmission output speed, and producing a postshift acceleration signal indicative of the wheel power subsequent to the upshift operation.

3. A method, as set forth in claim 2, wherein the step of determining the difference in wheel power magnitude for a gear shift includes the steps of calculating the difference between the preshift and postshift acceleration signal magnitudes, and producing an actual delta acceleration signal.

4. A method, as set forth in claim 3, including the steps of producing a desired delta acceleration signal having a value indicative of a desired change in wheel power magnitude.

5. A method, as set forth in claim 4, including the steps of receiving the actual and desired delta acceleration signals, comparing the actual and desired delta acceleration signal magnitudes, and responsively producing an error signal.

6. A method, as set forth in claim 5, including the steps of receiving the error signal, multiplying the error signal by a compensator gain value, and modifying the upshift shiftpoint to reduce the magnitude of the error signal.

7. A method, as set forth in claim 6, including the step of modifying the compensator gain value.

8. A method, as set forth in claim 7, including the steps of monitoring the frequency of a shift cycling conditions, and determining the severity of the shift cycling condition.

9. A method, as set forth in claim 8, including the step of further modifying the upshift shiftpoint in response to the severity of the shift cycling condition.

10. A method, as set forth in claim 9, including the step of increasing the value of the desired delta acceleration signal in response to a predetermined number of shift cycling conditions.

11. A method, as set forth in claim 10, including the step of decreasing the value of the desired delta acceleration signal in response to a predetermined number of shifts that occur in the absence of a shift cycling condition.

12. A method, as set forth in claim 1, including the step of modifying the downshift shiftpoint in response to the modified upshift shiftpoint.

13. A method, as set forth in claim 12, including the step of determining whether a recently completed shift may be utilized to modify the downshift and upshift shiftpoints.

14. A method of effecting transmission shifts in a vehicle having an automatic transmission including a plurality of transmission gear ratios and a transmission actuator for automatically establishing a particular gear ratio in response to a transmission control signal, the method comprising the steps of:

storing an upshift and downshift shiftpoint for each transmission gear ratio;

sensing the output speed of the transmission prior to a transmission upshift operation, determining the vehicle acceleration based on the transmission output speed, and producing a preshift acceleration signal indicative of the wheel power prior to the upshift operation;

sensing the output speed of the transmission subsequent to the upshift operation, determining the vehicle acceleration based on the transmission output speed, and producing a postshift acceleration signal indicative of the wheel power subsequent to the upshift operation;

calculating the difference between the preshift and postshift acceleration signal magnitudes, and producing an actual delta acceleration signal;

producing a desired delta acceleration signal having a value indicative of a desired change in wheel power magnitude; and receiving the actual and desired delta acceleration signals, comparing the actual and desired delta acceleration signals, and modifying the upshift shiftpoint associated with the upshift operation in response to the difference between the actual and desired delta acceleration signals.

* * * * *